United States Patent [19]
Tison et al.

[11] Patent Number: 5,949,153
[45] Date of Patent: Sep. 7, 1999

[54] MULTI-ENGINE CONTROLLER

[75] Inventors: Raymond R. Tison, Mentor; Ross F. Nigro, North Ridgeville; Robert J. Sprafka, Willoughby, all of Ohio

[73] Assignee: Consolidated Natural Gas Service Company, Inc., Pittsburgh, Pa.

[21] Appl. No.: 08/812,864

[22] Filed: Mar. 6, 1997

[51] Int. Cl.⁶ .................................................. H02J 3/00
[52] U.S. Cl. .............................. 307/29; 307/18; 307/40; 307/80; 395/182.2; 364/528.22
[58] Field of Search ................................. 307/29, 18, 11, 307/80, 40; 327/594; 395/182.2; 364/528.21, 528.22

[56] References Cited

U.S. PATENT DOCUMENTS

| | | |
|---|---|---|
| 3,725,675 | 4/1973 | Olsen ........................................ 327/594 |
| 4,136,286 | 1/1979 | O'Halloran et al. . |
| 4,162,526 | 7/1979 | Gass et al. ............................ 395/182.2 |
| 4,215,276 | 7/1980 | Janeway ..................................... 307/40 |
| 4,271,473 | 6/1981 | Ross . |
| 4,283,634 | 8/1981 | Yannone et al. . |
| 4,305,129 | 12/1981 | Yannone et al. . |
| 4,356,402 | 10/1982 | Morimoto et al. ........................ 307/80 |
| 4,430,573 | 2/1984 | Kaya et al. . |
| 4,455,614 | 6/1984 | Martz et al. . |
| 4,467,216 | 8/1984 | Murphy . |
| 4,491,737 | 1/1985 | Ishikawa et al. . |
| 4,514,642 | 4/1985 | Ross . |
| 4,527,071 | 7/1985 | Ausiello . |
| 4,731,547 | 3/1988 | Alenduff et al. . |
| 4,789,789 | 12/1988 | Kersenbrock et al. . |
| 4,881,184 | 11/1989 | Abegg, III et al. . |
| 5,180,923 | 1/1993 | Tyler . |

*Primary Examiner*—Albert W. Paladini
*Attorney, Agent, or Firm*—Pearne, Gordon, McCoy & Granger LLP

[57] ABSTRACT

A controller and method for controlling two or more electrical generators to meet the applied load, varies the activation/deactivation sequence of the generators according to and instruction set selected by time or day or other discrete event. The controller and method also control discretionary loads via a request to run process which allows the generation system to be readied for the additional load.

24 Claims, 1 Drawing Sheet

MULTI-ENGINE CONTROLLER

BACKGROUND OF THE INVENTION

The present invention relates to controls for multiple electrical power sources, in particular to controls for matching the available power to the demand.

In many situations it is desirable (or necessary) to obtain electrical power from grid isolated installations of electrical generators rather than from conventional electric utilities. This may be the sole source of electrical power or for backup power.

This situation presents problems that are not found in the electric utility context. Electric utilities normally have substantial spinning reserves of their own and interconnections with other utilities. Demand fluctuations tend to be relatively small with respect to the total load being served.

In a small electrical power installation, a single generator to handle the entire maximum expected demand can be used, but the generator is then typically under loaded and may be inefficient. In addition, this provides no backup if the single unit generator fails.

An installation which overcomes this problem uses two or more smaller generators that have a combined capacity capable of meeting or exceeding the maximum expected demand. This allows generators to be activated or deactivated to more closely match the demand with resulting maintenance of efficiency. With several smaller generators, sufficient excess capacity can be provided to allow for individual generator down time.

SUMMARY OF THE INVENTION

The present invention provides a controller and a method for automatically matching on-line generator capacity to demand and/or adjusting demand to capacity. This provides for optimal generator efficiency and minimizes the need for human operators.

A controller for a plurality of electrical power sources which can be activated or deactivated by the controller includes a processing unit, where the processing unit is adapted to provide control signals to the power sources. It also includes a first operating instruction set accessible by the processing unit and a second operating instruction set accessible by the processing unit, where the additional instruction sets are different from the first instruction set. Also included, is a real-time clock accessible by the processing unit. The processing unit is adapted to operate according to one of the instruction sets selected in response to the real-time clock, use input, or site conditions.

A method for controlling a plurality of electrical power sources which can be activated or deactivated by a controller includes providing a first operating instruction set and providing a second operating parameter set, where the additional instruction sets are different from the first instruction set. It also includes providing a real-time clock and activating/deactivating the power sources in accordance with one of the instruction sets based on a time input from the real-time clock.

DESCRIPTION OF THE PREFERRED EMBODIMENTS

Figure 1:
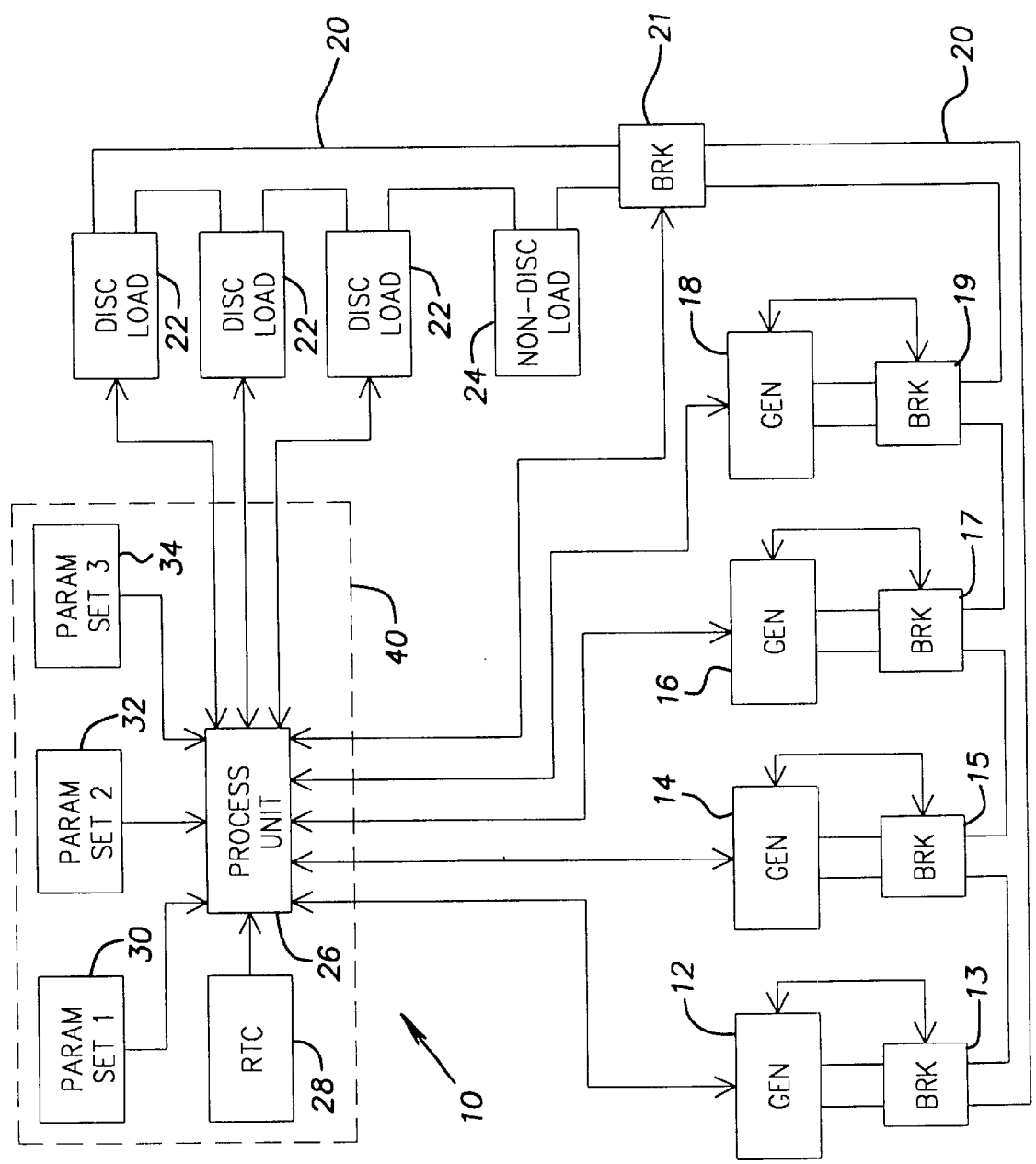
FIG. 1 is a block diagram of an electrical power system according to the invention.

Referring to FIG. 1, an electrical power system 10 includes a controller 40 and generators 12, 14, 16, 18. A power bus 20 feeds discretionary loads 22 and a non-discretionary load 24. The generators 12, 14, 16, 18 are connectable through respective breakers 13, 15, 17, 19 to the bus 20. A processing unit 26 provides control signals to the generators 12, 14, 16, 18 and the discretionary loads 22. The processing unit 26 receives status and measurement data from the generators 12, 14, 16, 18 and the discretionary loads 22. The generators 12, 14, 16, 18 communicate open, close, and shunt trip commands to their respective breakers 13, 15, 17, 19 and received status information back. A breaker 21 allows the loads 22, 24 to be disconnected from the generators 12, 14, 16, 18 under command of the controller 40. A real-time clock 28 provides time of day information to the processing unit 26. Instruction sets 30, 32, 34 provide generator operating instruction sets to the processing unit 26.

The generators 12, 14, 16, 18 are preferably driven by natural gas fueled internal combustion engines. However, the invention is applicable to generators driven by other prime movers, as well as to other electrical power sources such as fuel cells. The generators 12, 14, 16, 18 may be of various relative capacities, for example, a 20 KW generator, two 60 KW generators and a 100 KW generator, respectively. The selection of generator sizes can depend on several factors, including, conformity and load considerations. While the example given uses generators in the 20–100 KW range, the invention is independent of generator size and number.

The processing unit 26, real-time clock 28 and instruction sets 30, 32, 34 may be, for example, individual specialized digital devices or implemented within a general purpose minicomputer or microcomputer.

The discretionary loads 22 include devices for disconnecting the respective load from the bus 20 in response to the processing unit 26. The loads 22 may also include devices and/or circuitry for informing the processing unit 26 that a load 22 desires to be connected to the bus 20. In many cases, a manual or automatic switch located at the load 22 and wired to the processing unit 26 may be sufficient to supply a request to run signal for the load 22.

Typically the power demand for a system 10 varies according to the time of day and the day of the week. For example, in a typical commercial installation, the demand drops off both at night and on weekends.

The generators 12, 14, 16, 18 are activated/deactivated in different sequences according to the active instruction set. For example an installation with time of day and day of week control may operate as follows: During the day of a weekday, high demands may be expected. In this case, the largest capacity generator 18 might be activated first, followed as required by the two medium capacity generators 14, 16 and lastly by the low capacity generator 12. The generators would be deactivated in reverse order as demand permitted. During a weekend day, when demand is expected to be low, the smallest generator 12 would be activated first and the next largest generators activated as required. The generators would be deactivated in reverse order as demand permitted. At night, an intermediate demand may be expected. In this case a medium capacity generators 14, 6 would be activated first, followed as required, by the low capacity generator 12, the medium capacity generator 16 and finally the high capacity generator 18. The generators would be deactivated in reverse order as demand permitted. Transition from one instruction set to another is a accomplished by activating generators required by the new instruction set and then deactivating generators as needed.

It is of course possible to use more or less generators than the four shown in FIG. 1. It also may be desirable to have activation and deactivation sequences that are not directly related.

In the preferred embodiment, the activation/deactivation sequences for the night demand, weekday demand and weekend day demand are stored in a respective instruction set 30, 32, 34. The processing unit 26 selects the appropriate instruction set according to current time of day and day of week information provided to the processing unit 26 by the real-time clock 28. The characterization of demand by nights, weekdays and weekend days is by way of example. In a particular installation, other time-based patterns for demand or other events may exist and be effectively utilized by the invention for instruction set changes.

To determine when to move up or down the currently selected activation/deactivation sequence, the processing unit 26 monitors the output of the generators 12, 14, 16, 18. The processing unit 10 tracks the "reserve power" and the "excess power". The reserve power is the total power capacity of the currently activated generators can produce less the power they are currently producing. The excess power is the reserve power less the power capacity of the generator that is the next candidate for deactivation according to the activation/deactivation sequence.

The processing unit 26 activates the next generator in the sequence when the reserve power drops below a minimum value. This minimum reserve power value is user selectable and may vary according to the instruction set. For example, it may be 30 KW during a weekday and 5 KW during a weekend day.

Similarly, the processing unit 26 deactivates the next generator in the sequence when the excess power rises above a value for a minimum time. The maximum excess power value and minimum time value are user selectable and may vary according to the instruction set. For example, the maximum excess power may be 80 KW during a weekday and 30 KW during a weekend day.

In some installations, particularly industrial installations, there may be one or more discretionary loads 22. These loads are of a nature that it is acceptable to the user to require the processing unit 26 to grant permission before they can be connected to the bus 20 or to allow the processing unit 26 to disconnect them from the bus to connect a higher priority load.

The processing unit 26 contains stored parameters for the expected running and starting load for each of the discretionary loads 22. These stored parameters may include the steady state demand, as well as the expected transient demand. In addition, each of the loads 22 may have a priority. This priority value can be part of the instruction sets 30, 32, 34 and may vary from set to set.

When a discretionary load 22 requests permission to connect to the bus 20, the processing unit 26 calculates an expected load from the sum of the current load and the stored parameters for the load 22. If, for example, the expected load would cause the reserve power to drop below the minimum reserve power value, additional generators are activated according to the activation/deactivation sequence. If and when there is sufficient on-line capacity to maintain the minimum reserve power value, the processing unit 26 allows the load 22 to connect to the bus 20.

Also included in the instruction sets is the starting requirements of the discretionary loads 22. In the case of loads such as motors, this transient load can be much higher than the running load. It may then be necessary to add generators or drop other loads as specified by an instruction set to start the load.

In some cases such as when generators are being serviced, adding discretionary load 22 would exceed the capacity of the power system 10. In these cases, the processing unit 26 determines if there are any other discretionary loads connected to the bus 20 that have a lower priority value than the priority value of the load 22 seeking permission. The processing unit 26 would then determine if dropping one or more of the lower priority discretionary loads 22 (in priority order) would provide a reserve power value above the minimum. If sufficient power could be made available, the processing unit would drop one or more lower priority loads 22 and grant permission to the higher priority load 22 seeking permission.

The controller 40 can also be used to handle the situation of a generator about to be shut down. This can be caused by a condition such as overheating of the generator or its engine, dropping engine oil pressure or other indicators of a pending need of a shut down.

With a pending fault the controller must satisfy the reserve power requirement as specified by the active instruction set while excluding the generator with the pending fault from the calculations. Once additional generation is started and or discretionary loads are dropped to meet the reserve power requirement the generator with the pending fault is shut down.

An operator request to shut down a generator for whatever reason is treated like a pending fault except that the controller can refuse the request if enough other generators are not available.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed:

1. A controller for a plurality of electrical power sources which can be activated or deactivated by said controller, said controller comprising:

a processing unit, said processing unit being adapted to provide control signals to said power sources;

a first operating parameter set accessible by said processing unit;

a second operating parameter set accessible by said processing unit, said second parameter set being different from said first parameter set; and a real-time clock accessible by said processing unit, said processing unit being adapted to receive time information from said clock, to select one of said parameter sets in response to said time information and to control said power sources according to said selected parameter set.

2. A controller according to claim 1, wherein said parameter sets each include a minimum reserve power value and a maximum excess power value.

3. A controller according to claim 1, wherein said processing unit is adapted to control a plurality of discretionary loads, said loads each having a priority value included in said parameter sets, said processing unit being adapted to operate in accordance with said priority values.

4. A controller according to claim 1, said processing unit being further adapted to activate/deactivate said power sources in response to a load requesting permission to run.

5. A controller according to claim 1, said processing unit being further adapted to activate/deactivate said power sources in response a pending fault in at least one power source.

6. A controller according to claim 1, wherein said parameter sets each include a sequence for activating/deactivating said power sources.

7. A controller according to claim 6, wherein said sequences include different orders for activating and deactivating.

8. A method for controlling a plurality of electrical power sources which can be activated or deactivated by a controller, said method comprising:

providing a first operating parameter set;

providing a second operating parameter set, said second parameter set being different from said first parameter set;

providing a real-time clock; and activating/deactivating said power sources in accordance with one of said parameter sets based on a time input from said real-time clock.

9. A method according to claim 8, wherein said parameter sets each include a minimum reserve power value and a maximum excess power value.

10. A method according to claim 8, wherein said parameter sets each further include a priority value for each of a plurality of discretionary loads and said method further comprises controlling said loads in accordance with said priority values.

11. A method according to claim 8, further comprising activating/deactivating said power sources in response to a load requesting permission to run.

12. A method according to claim 8, further comprising activating/deactivating said power sources in response to a pending fault in a source.

13. A method according to claim 8, wherein said parameter sets each include a sequence for activating/deactivating said power sources.

14. A method according to claim 13, wherein said sequences include different orders for activating and deactivating.

15. A controller for a plurality of electrical power sources which can be activated or deactivated by said controller, said controller comprising:

a processing unit, said processing unit being adapted to provide control signals to said power sources;

a first operating parameter set accessible by said processing unit, said first parameter set including a sequence for activating/deactivating said power sources, a minimum reserve power value and a maximum excess power value;

a second operating parameter set accessible by said processing unit, said second parameter set including a sequence for activating/deactivating said power sources, a minimum reserve power value and a maximum excess power value, and said second parameter set being different from said first parameter set; and a real-time clock accessible by said processing unit, said processing unit being adapted to receive time information from said clock, to select one of said parameter sets in response to said time information and to control said power sources according to said selected parameter set.

16. A controller according to claim 15, wherein said sequences include different orders for activating and deactivating.

17. A controller according to claim 15, said processing unit being further adapted to activate/deactivate said power sources in response to a load requesting permission to run.

18. A controller according to claim 15, said processing unit being further adapted to activate/deactivate said power sources in response a pending fault in a power source.

19. A controller according to claim 15, wherein said processing unit is adapted to control a plurality of discretionary loads, said loads each having a priority value included in said instruction sets, said processing unit being adapted to operate in accordance with said priority values.

20. A method for controlling a plurality of electrical power sources which can be activated or deactivated by a controller, said method comprising:

providing a first operating parameter set, said first parameter set including a sequence for activating/deactivating said power sources, a minimum reserve power value and a maximum excess power value;

providing a second operating parameter set, said second parameter set including a sequence for activating/deactivating said power sources, a minimum reserve power value and a maximum excess power value, and said second parameter set being different from said first parameter set;

providing a real-time clock; and activating/deactivating said power sources in accordance with one of said instruction sets based on a time input from said real-time clock.

21. A method according to claim 20, wherein said sequences include different orders for activating and deactivating.

22. A method according to claim 20, further comprising activating/deactivating said power sources in response to a load requesting permission to run.

23. A method according to claim 20, further comprising activating/deactivating said power sources in response to a pending fault in at least one power source.

24. A method according to claim 20, wherein said instruction sets each further include a priority value for each of a plurality of discretionary loads and said method further comprises controlling said loads in accordance with said priority values.

* * * * *

UNITED STATES PATENT AND TRADEMARK OFFICE
CERTIFICATE OF CORRECTION

PATENT NO. : 5,949,153
DATED : September 7, 1999
INVENTOR(S) : Raymond R. Tison, et al.

It is certified that error appears in the above-identified patent and that said Letters Patent is hereby corrected as shown below:

Claim 20, line 16 delete "instruction" and insert therefore --parameter--.

Claim 24, lines 1-2 delete "instruction" and insert therefore --parameter--.

Signed and Sealed this

Sixteenth Day of May, 2000

Attest:

Q. TODD DICKINSON

*Attesting Officer*        *Director of Patents and Trademarks*